Nov. 16, 1965  R. H. ROYSTER  3,217,609
FLUID PRESSURE ACTUATOR AND LOCKING MEANS
Filed Oct. 21, 1963  4 Sheets-Sheet 2
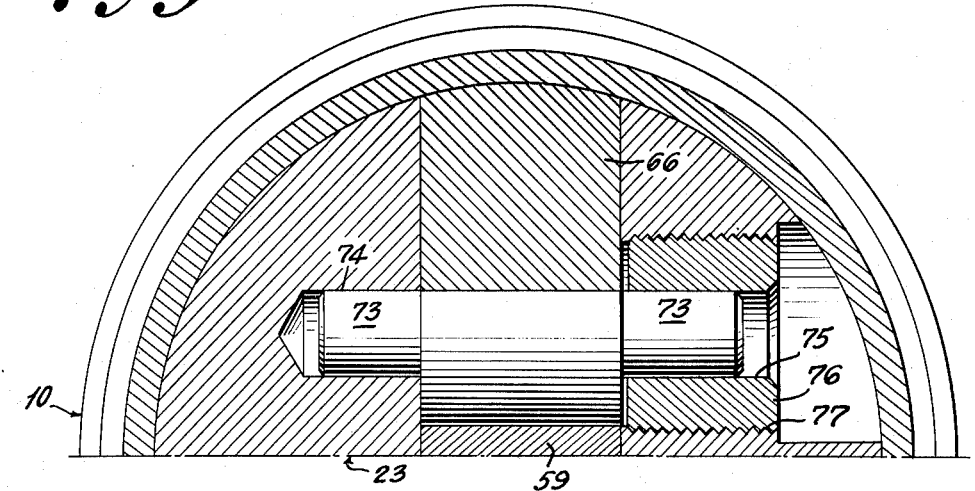
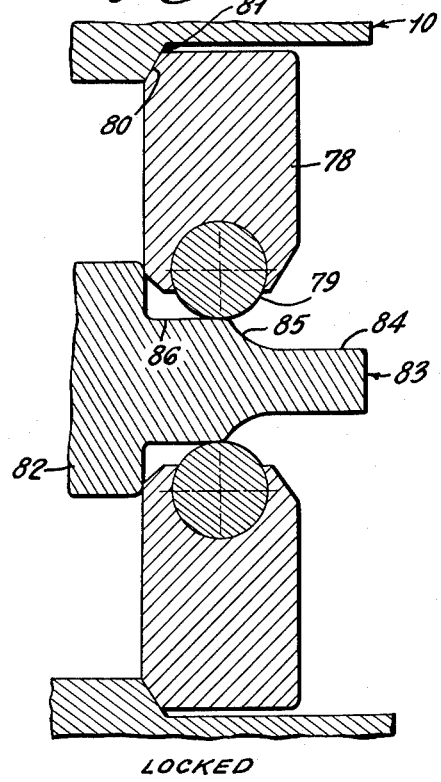
LOCKED
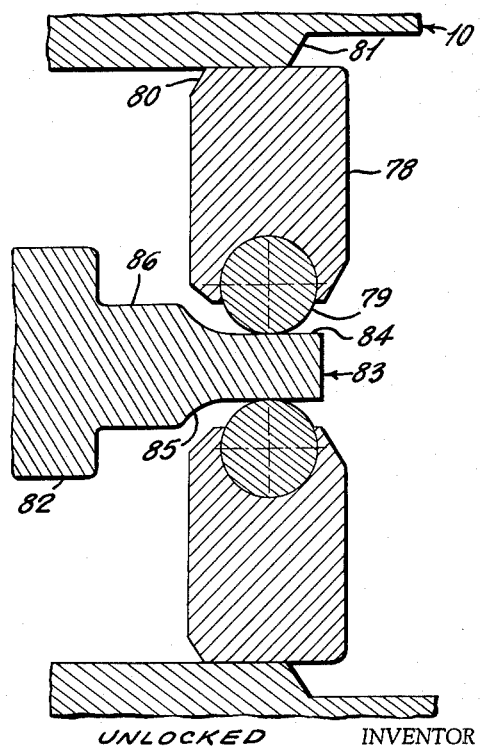
UNLOCKED
INVENTOR
ROBERT H. ROYSTER
BY
ATTORNEY

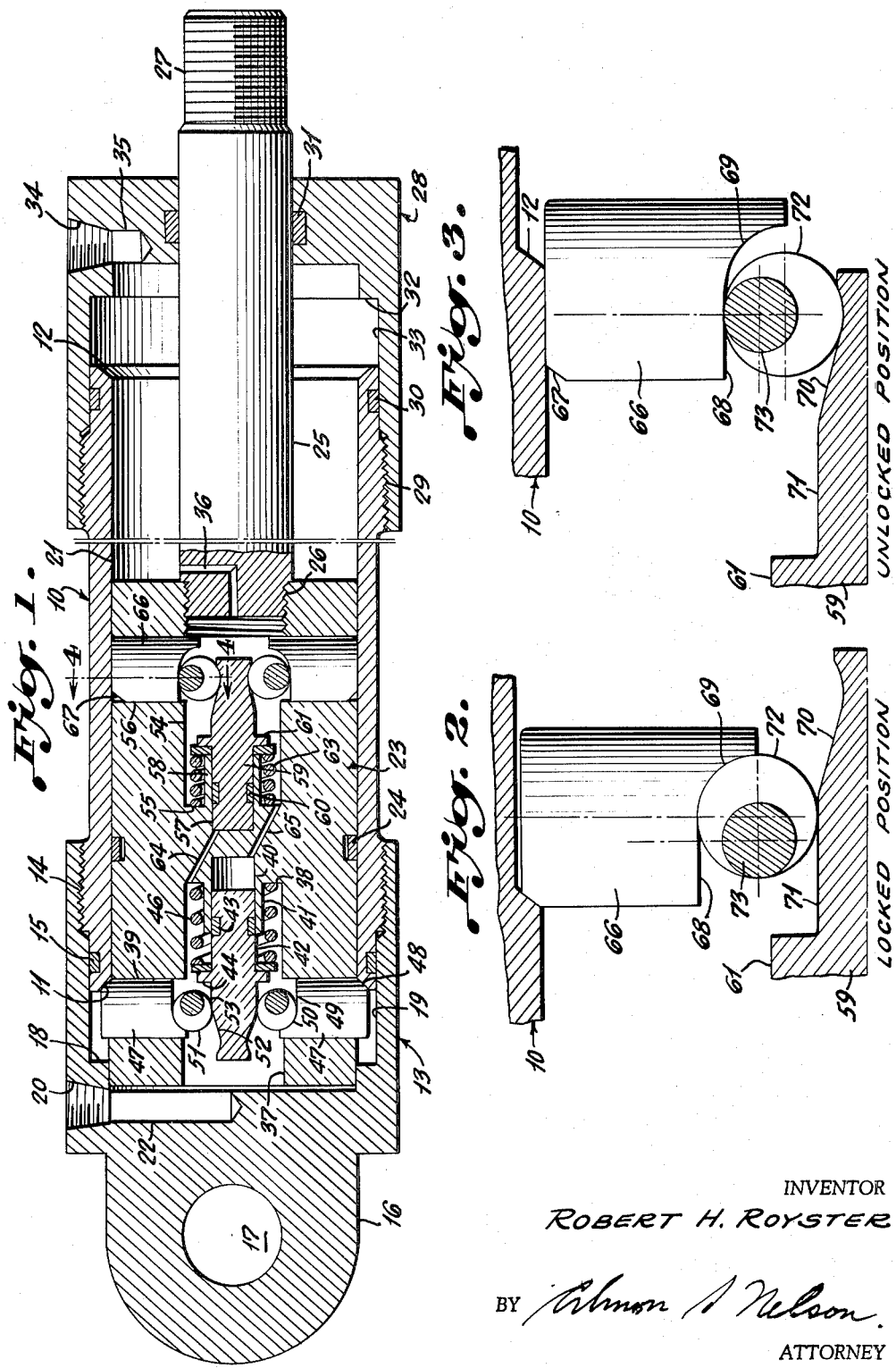

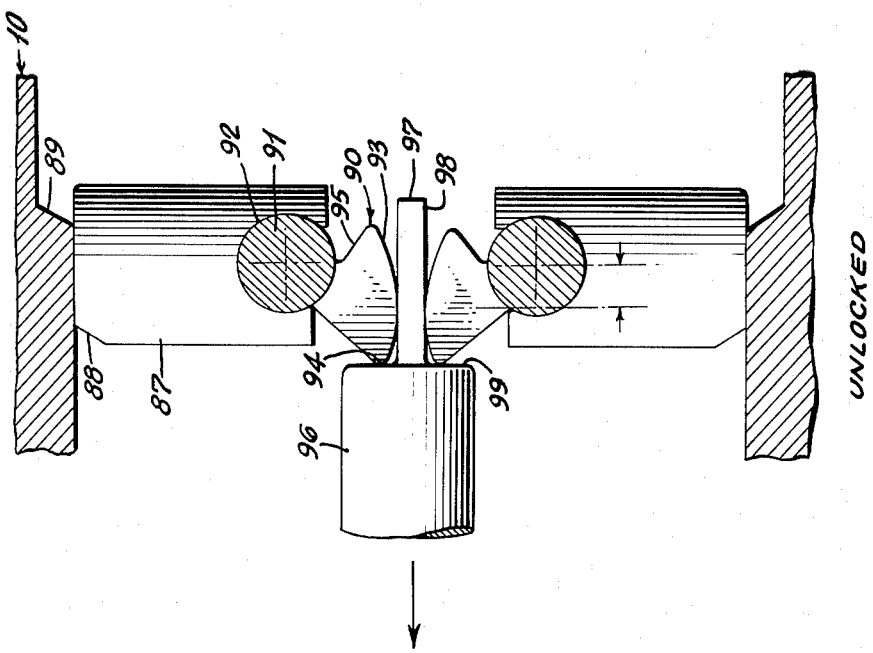
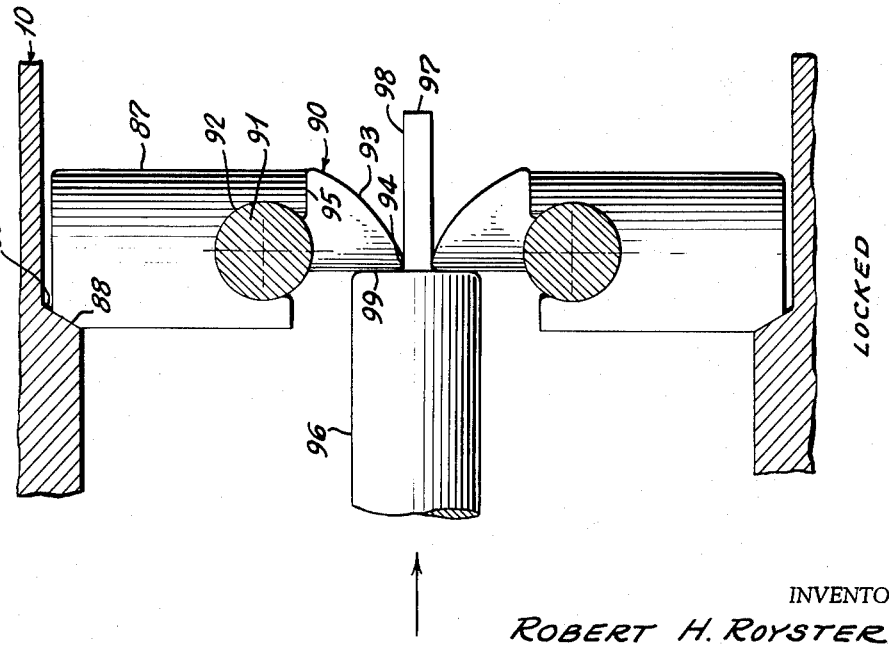

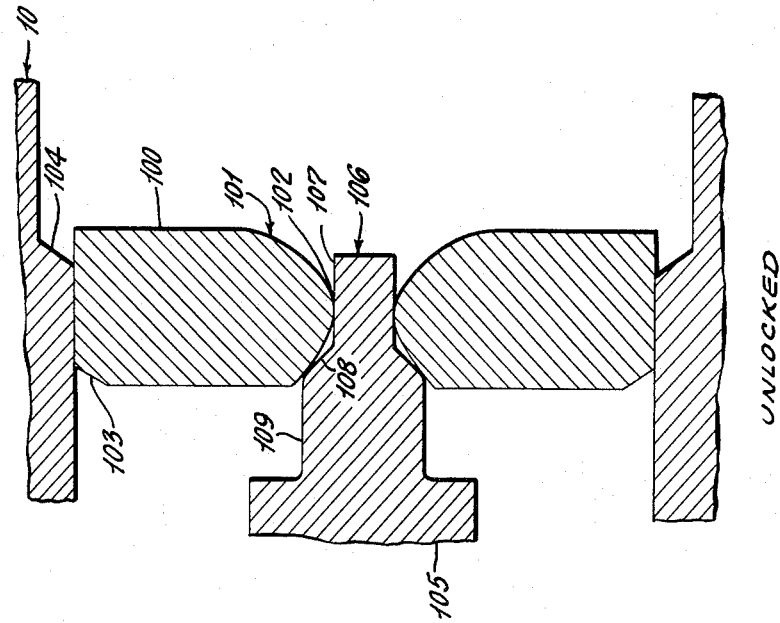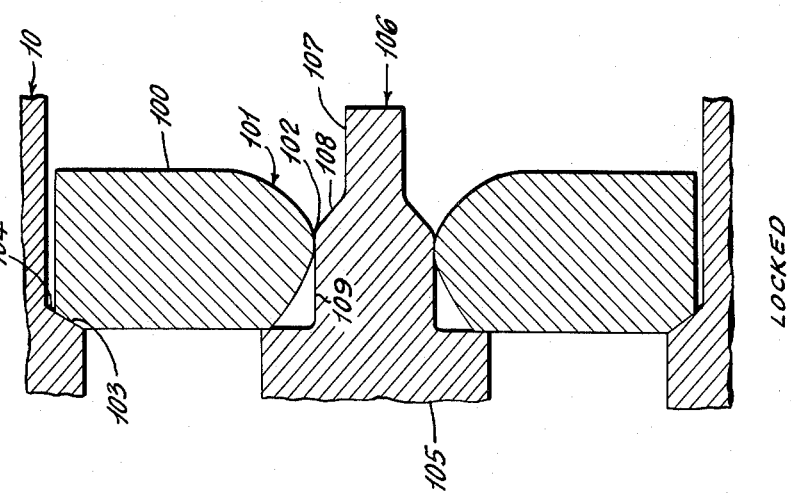

United States Patent Office 3,217,609
Patented Nov. 16, 1965

3,217,609
FLUID PRESSURE ACTUATOR AND
LOCKING MEANS
Robert H. Royster, 1436 Serenade Terrace,
Corona del Mar, Calif.
Filed Oct. 21, 1963, Ser. No. 317,760
6 Claims. (Cl. 92—24)

This application is a continuation in part of my copending application, Serial No. 109,885, filed May 15, 1961, now Patent No. 3,107,582, dated October 22, 1963.

This invention relates to fluid pressure or hydraulically operated mechanisms and more particularly to a fluid pressure actuator and locking means which may be utilized in the landing gear structure of aircraft or for any other application where it is desired to utilize fluid pressure actuated means for moving an element to a desired position and for thereafter locking the element in such position.

Heretofore numerous types of fluid pressure actuators incorporating locking means have been proposed and utilized, particularly in connection with the aircraft industry and while these prior art devices have operated satisfactorily insofar as providing a motive force for moving an element from one position to another, the locking means incorporated therein has given considerable trouble, in that, in general, such prior art locking means has involved relatively delicate mechanisms and frequent failure thereof has been experienced. Moreover, these prior art locking devices incorporated in fluid pressure actuators have been relatively complex and costly to manufacture and furthermore, repair thereof or replacement upon failure has also been relatively costly. Also in some instances, as the result of wear, play has developed between the parts of the locking mechanism which has sometimes resulted in failure to provide a positive lock with the result that inadvertent movement of the element operated by the fluid pressure actuator has taken place which in certain instances, could be disastrous.

It is accordingly an object of the invention to provide a fluid pressure actuator and locking means which may be conveniently and economically constructed from readily available materials and which will provide a positive lock, regardless of wear or play between the parts.

A further object of the invention is the provision of a fluid pressure actuator and locking means in which the locking mechanism is relatively simple and eliminates the use of levers thereby reducing likelihood of failure to a minimum.

A still further object of the invention is the provision of a fluid pressure actuator and locking means in which the locking action is accomplished by a combination of spring means and fluid pressure means thereby providing for operation of the locking means by either the spring means or fluid pressure means in the event of failure of one or the other.

Another object of the invention is the provision of a fluid pressure actuator and locking means in which the entire operation of the device is controlled merely by the admission of fluid pressure thereto.

A further object of the invention is the provision of a fluid pressure actuator and locking means which may be constructed as a double-acting or single-acting device while still utilizing the same basic actuating and locking mechanisms.

A still further object of the invention is the provision of a fluid pressure actuator and locking means in which the locking means includes radially movable locking detents in the form of bolts and in which one bolt, or two, three, four or more circumferentially spaced bolts may be utilized depending upon the size and load requirement while still utilizing the same basic locking mechanism.

Another object of the invention is the provision of a fluid pressure actuator and locking means in which the locking means includes radially movable locking detents actuated by locking cam means, including inclined and flat surfaces in contact with rollers, or other suitable rounded surface of appropriate radius, all of the parts being in contact at all times and in compression, thereby providing a particularly strong structure and reducing the likelihood of failure.

A further object of the invention is the provision of a fluid pressure actuator and locking means in which the locking means includes radially movable locking detents which are actuated by locking cam means, including inclined and flat surfaces engaged by a roller and in which a flat surface is provided on the inner end of each detent and inclined and flat surfaces on a plunger, the roller being disposed between the plunger and each detent and the roller being eccentrically mounted with respect to the longitudinal axis of the detents.

A still further object of the invention is the provision of a fluid pressure actuator and locking means in which the locking means includes radially movable detents actuated by locking cam means, including inclined and flat surfaces engaged by rollers in which such rollers are retained in the inner ends of the locking detent and the inclined and flat surfaces are provided on plungers actuated by a spring or fluid pressure or both.

Another object of the invention is the provision of a fluid pressure actuator and locking means constructed as a double acting device which will pull or push in either direction and in which the device may be locked in position at both ends of the stroke.

Further objects and advantages of the invention will be apparent from the following description taken in conjunction with the accompanying drawings wherein:

FIG. 1 is a longitudinal sectional view of a fluid pressure actuator and locking means constructed in accordance with this invention and showing the device locked in position at one end of the stroke;

FIG. 2 is a fragmentary sectional view showing the details of the locking means of FIG. 1 and with the locking detent in locked position;

FIG. 3 is a fragmentary sectional view similar to FIG. 2, and showing the locking detent in unlocked position;

FIG. 4 is a sectional view taken substantially on the line 4—4 of FIG. 1 and showing the means for eccentrically mounting the roller shown in FIG. 1;

FIG. 5 is a fragmentary sectional view similar to FIG. 2, but showing a modified form of locking means in which rollers are mounted in the inner ends of the locking detents and engage flat surfaces and inclined surfaces on a plunger and with the detents in locked position;

FIG. 6 is a fragmentary sectional view similar to FIG. 5, but showing the detents in unlocked position;

FIG. 7 is a fragmentary sectional view showing a further modified form of locking mechanism in which toggle members are rockably mounted in the inner ends of the locking detent with nose portions on the toggle members engaging an abutment or shoulder on a plunger and showing the detents in locked position;

FIG. 8 is a fragmentary sectional view similar to FIG. 7, but showing the detents in unlocked position;

FIG. 9 is a fragmentary sectional view similar to FIG. 5, but showing a further modified form of locking means in which the inner ends of the detents are rounded to provide a surface having an appropriate radius engaging flat surface and inclined surfaces on a plunger and with the detents in locked position; and FIG. 10 is a fragmentary sectional view similar to FIG. 9, but showing the detents in unlocked position.

With continued reference to the drawings, and particularly to FIGS. 1 to 4, there is shown a double-acting fluid pressure actuator and locking means constructed in accordance with this invention and which may well comprise an elongated hollow cylinder 10, the end surfaces 11 and 12 of which are beveled outwardly. A cylinder head 13 is secured by screw threaded or other suitable means 14 to one end of the cylinder 10 and suitable packing means 15 may be provided between the cylinder head 13 and cylinder 10 in order to provide a fluid-tight connection therebetween. The cylinder head 13 may be provided with an outwardly extending ear 16 having an aperture 17 therein for facilitating attachment of the device to a cooperating structure and it is also to be noted that the cylinder head 13 is provided with an inner annular shoulder 18 spaced from the beveled end 11 of the cylinder 10 in order to provide an inwardly opening angular recess 19 between the cylinder head 13 and the beveled end 11 of the cylinder 10. The cylinder head 13 is also provided with a fluid pressure inlet 20 communicating with the bore 21 of the cylinder 10 through a passage 22 in the cylinder head 13.

A piston 23 is slidably received in the bore 21 of the cylinder 10 and suitable packing means 24 may be provided on the piston 23 for engaging the wall of the bore 21 in order to provide a fluid pressure seal therebetween. A piston rod 25 may be detachably secured by screw threaded or other suitable fastening means 26 to the piston 23 and the piston rod 25 projects from the opposite end of the cylinder 10 from the cylinder head 13 and piston rod 25 may be provided with screw threads 27 or other suitable means at the outer end thereof to facilitate attachment of the piston rod 25 to an element to be operated thereby.

A second cylinder head 28 is secured to the cylinder 10 opposite the cylinder head 13 by screw threaded or other suitable means 29 and suitable packing means 30 may be provided between the cylinder 10 and cylinder head 28 in order to provide a fluid-tight connection therebetween. The cylinder head 28 is also provided with suitable packing means 31 engaging the piston rod 25 in order to prevent leakage of fluid pressure therebetween while still providing for sliding movement of the piston rod 25.

An inner annular shoulder 32 formed on the cylinder head 28 is spaced from the adjacent beveled end 12 of the cylinder 10 in order to provide a second inwardly opening annular recess 33 at the opposite end of the cylinder 10 from the annular recess 19. The cylinder head 28 is provided with a second fluid pressure inlet 34 communicating through a passage 35 with the bore 21 of the cylinder 10. It is also to be noted that the inner end of the piston rod 25 is provided with a passage 36 communicating with the bore 21 of the cylinder 10 and opening inwardly of the inner end of the piston rod 25. The purpose of this passage 36 will be later described.

The piston 23 is provided at the end opposite the piston rod 25 with a central axial bore 37 terminating at a point 38 within the piston 23 and a plurality of radial apertures 39 are formed in the piston 23 communicating with the bore 37 and opening radially outwardly of the piston 23. A second central axial bore 40 of smaller diameter than the bore 37 and concentric therewith is provided in the piston 23 and as shown in FIG. 1, the bores 37 and 40 are so formed as to provide a sleeve 41 therebetween. A plunger 42 is slidably disposed in the bore 40 and the plunger 42 may be provided with suitable packing means 43 engaging the wall of the bore 40 to provide a fluid tight engagement therebetween. An annular flange 44 is provided on the plunger 42 and engaging the rear surface of the flange 44 is the outer end of a compression spring 46 received in the bore 37 with the inner end of the spring 46 engaging the inner end 38 of the bore 37.

Locking detents in the form of cylindrical bolts 47 are slidably disposed in the apertures 39 and the outer ends of the detents 47 are provided with beveled surfaces 48 cooperating with the beveled end surface 11 on the cylinder 10 and the inner ends of the detents 47 are provided with flat surfaces 49 which merge into arcuate surfaces 50 and such surfaces serve to engage a rockable element in the form of a roller 51 eccentrically mounted on the piston 23. The roller 51 in turn engages inclined surfaces 52 and flat surfaces 53 on the plunger 42. The specific structure and operation of the detents 47, rollers 51 and plunger 42 will be described in connection with such structure at the opposite end of the piston 23 which is identical therewith.

A central axial bore 54 is provided in the opposite end of the piston 23 and the bore 54 terminates at a point 55 in the piston 23. A plurality of radial apertures 56 are provided in the piston 23 communicating with the bore 54 and opening radially outwardly of the piston 23. A second central axial bore 57 concentric with the bore 54 and of smaller diameter is provided in the piston 23 and as shown in FIG. 1, the relationship of bores 54 and 57 is such as to provide a sleeve 58 therebetween. Slidably received in the second bore 57 is a plunger 59 and suitable packing means 60 may be provided thereon engaging the wall of the bore 57 in order to provide a fluid-tight connection therebetween. An annular flange 61 is provided on the plunger 59 and the inner side of the flange 61 is engaged by the outer end of a compression spring 63 disposed in the bore 54 and with the inner end of the spring 63 engaging the inner end 55 of the bore 54. A fluid pressure passage 64 is provided between the bore 37 and the bore 57 and a similar fluid passage 65 is provided between the bore 40 and the bore 54. The purpose and operation of these passages 64 and 65 will be presently described.

With particular reference to FIGS. 1, 2, 3 and 4, locking detents 66 in the form of cylindrical bolts are slidably received in the radial apertures 56 and the detents 66 are provided with beveled surfaces 67 on the outer ends thereof for cooperating with the beveled end surface 12 on the cylinder 10. As best shown in FIGS. 2 and 3, each locking detent 66 is provided on the inner end thereof with a flat surface 68 which terminates in an arcuate surface 69. The plunger 59 is provided on the outer end thereof with an inclined surface 70 which extends inwardly and terminates in a flat surface 71.

A rockable element in the form of a roller 72 is provided with trunnions 73 at opposite ends thereof and as best shown in FIG. 4, one trunnion 73 is rotatably received in a bore 74 in the piston 23 while the other trunnion 73 is received in a bore 75 in a bushing 76 which in turn is secured by screw threaded means or the like 77 in the piston 23. It is to be noted that the trunnions 73 are eccentric to the roller 72 and that the mounting thereof is offset transversely with respect to the longitudinal center line of the detents 66. It is further to be noted that the radius of the arcuate surface 69 on the inner end of the detent 66 is substantially equal to the radius of the roller 72.

In FIG. 1, the piston 23 is shown locked in retracted position by engagement of the outer ends of the detents 47 with the beveled end surface 11 of the cylinder 10 with the outer ends of the detents 47 disposed in the annular recess 19 and in order to operate the device to extend piston rod 25, it is only necessary to introduce fluid pressure through the inlet 20 and passage 22 into the bore 21 of the cylinder 10, at which time, such fluid pressure will impinge on the flange 44 of the plunger 42 and urge such plunger inwardly of the bore 40 in the piston 43 against the action of spring 46 which will permit inward movement of the locking detents 47, by reason of the fact that the eccentrically mounted rocking elements or rollers 51 will move from the flat surface 53 on the plunger 42 down the inclined surface 52 which will result in pivotal movement of the rollers 51 about the eccentric mounting thereof from the position shown in FIG. 2 to the position shown in FIG. 3 and, therefore, this will result in inward movement of the detents 47 to disengage the same from the beveled end surface 11 of the cylinder 10 thereby permitting movement of the piston 23 under the action of fluid pressure toward the right as viewed in FIG. 1.

When the piston 23 reaches the opposite end of the stroke fluid pressure flowing through the passage 64 from the bore 37 to the bore 57, together with the compression spring 63 will urge the plunger 59 outwardly of the piston 23 which will result in the inclined surfaces 70 on the plunger 59 engaging the eccentrically mounted rockable elements or rollers 72 to pivotally move the same about the eccentric mounting thereof and since the surface of the roller 72 is in engagement with the flat surface 68 on the inner end of detent 66, this will result in outward movement of the detent 66 until the surface of the roller 72 engages the arcuate surface 69 on the inner end of the detent 66, at which time the roller 72 also engages the flat surface 71 on the plunger 59. This movement of the detents 66 outwardly into the angular recess 33 results in engagement of the beveled ends 67 of the detents 66 with the beveled end 12 of the cylinder 10 thereby locking the piston 23 against movement toward the left as viewed in FIG. 1.

It is to be noted that by reason of the fact that the eccentrically mounted rollers 72 engage both the flat surface 68 and arcuate surface 69 on the detents 66, as well as the flat surface 71 on the plunger 59 that all of the elements are in compression and the detents 66 are locked in outward positon by reason of the fact that any inward force exerted on the detents 66 cannot move the rollers 72 about the eccentric mounting thereof.

When it is desired to return the piston 23 to the opposite end of the cylinder, as shown in FIG. 1, it is only necessary to introduce fluid pressure through the fluid pressure inlet 34 and passage 35 to the bore 21 of the cylinder 10, at which time, such fluid pressure will flow through the passage 36 in the piston rod 25 and impinge on the flange 61 of the plunger 59 to move the plunger inwardly of the piston 23 at which time the rollers 72 will move from the flat surfaces 71 downwardly on the inclined surfaces 70 to permit pivotal movement of the rollers 72 from the position shown in FIG. 2 to the position shown in FIG. 3, thereby permitting inward movement of the locking detents 66 which will disengage the same from the beveled end surface 12 of the cylinder 10 thereby permitting return movement of the piston 23 under the action of fluid pressure in the cylinder 10. At the same time, fluid pressure flowing through the passage 65 from the bore 54 to the bore 40, together with the compression spring 46 will operate to move the plunger 42 outwardly and engagement of the inclined surfaces 52 on the plunger 42 with the eccentrical mounted rollers 51 will result in causing pivotal movement of the same to move the locking detents 47 radially outwardly into the annular recess 49 and to engage the beveled end surfaces 48 on the detents 47 with the beveled end surface 11 on the cylinder 10 to lock the piston 23 in the position shown in FIG. 1 and since the rollers 51 move into engagement with the arcuate surfaces 50 on the detents 47, as well as into engagement with the flat surfaces 53 on the plunger 42, the detents 47 will be locked in outermost position as shown in FIG. 1.

While the operations of the plungers 42 and 59 have been described as resulting from fluid pressure flowing through the passage 64 or 65 in conjunction with the compression springs 46 and 63, it is to be understood that in the event of failure of either the compression spring 46 or 63, the fluid pressure will serve to operate the plunger 42 or 59 and also in the event one or more of the passages 64 or 65 becomes clogged, the compression spring 46 or 63 will serve to actuate the plunger 42 or 59 to perform the locking action.

With particular reference to FIGS. 5 and 6, there is shown a modified form of operating means for the locking detents in which each of the radially movable detents 78 are provided with a roller 79 rotatably mounted in the inner ends thereof. The detents 78 are provided with beveled outer surfaces 80 which cooperate with the beveled end surface 81 on the cylinder 10. In this form of the invention, a plunger 82 similar to the plungers 42 and 59 of the above described form of the invention is provided on the outer end thereof with a shank portion 83 having diametrically opposed flat surfaces 84 thereon which merge into outwardly and inwardly extending curved cam surfaces 85 which terminate in flat surfaces 86 disclosed outwardly of the flat surfaces 84. As clearly shown in FIG. 5, when the rollers 79 are in engagement with the flat surfaces 86, the detents 78 are in outermost locking position with the beveled end surfaces 80 in engagement with the beveled end surface 81 of the cylinder 10 and in this position all of the parts are in compression and the detents 78 are locked in outermost position by reason of the fact that the flat surfaces 86 on the plunger 82 prevent inward movement of the detents 78. Upon movement of the plunger 82 toward the left as viewed in FIG. 5, the rollers 79 will move down the curved cam surfaces 85 into engagement with the flat surfaces 84 thereby permitting inward movement of the detents 78 to unlocked position as shown in FIG. 6. Movement of the plunger 82 toward the right as viewed in FIG. 6 will result in engagement of the rollers 79 with the curved cam surfaces 85 to move the detents 78 outwardly into locking position as shown in FIG. 5.

A still further form of the invention is shown in FIGS. 7 and 8 in which locking detents 87 are movable radially and are provided with beveled outer end surfaces 88 for engaging a beveled end surface 89 on cylinder 10 as in the previously described forms of the invention and the detents 87 are provided at the inner ends thereof with a toggle member 90 mounted for rocking movement about an axis at right angles to the longitudinal axis of the detent 87. The toggle member 90 may be provided with a circular portion 91 received in a circular recess 92 in the inner end of the detents 87 thereby permitting pivotal movement of the toggle member 90. The toggle member 90 is provided with a curved surface 93 terminating at one end in a nose portion 94 and at the opposite end in an abutment surface 95.

A plunger 96 similar to the plungers described above in connection with the other forms of the invention is provided at the outer end with a shank portion 97 having opposed flat surfaces 98 thereon and such flat surfaces 98 terminate at their inner ends in a shoulder 99.

In operation with the detents 87 in outward locking position as shown in FIG. 7, movement of the plunger 96 toward the left will result in permitting rocking movement of the toggle members 90 with the nose portions 94 in engagement with the shoulder 99 and as the detents 87 move inwardly the curved surface 93 on the toggle member 90 will engage the flat surface 98 on the shank portion 97 of the plunger 96, and such movement will continue until the detents 87 reach the inward position as shown in FIG. 8. Upon movement of the plunger 96 toward the right as viewed in FIG. 8, engagement of the shoulder 99 with the nose portions 94 on the toggle members 90 will result in rocking of such members to force the detents 87 outwardly until the abutment surfaces 95 on the toggle members 90 engage the inner end surfaces of the detents 87 and at this time the toggle members 90 are in dead center position and the detents 87 are locked in outward position as clearly shown in FIG. 7.

With particular reference to FIGS. 9 and 10, there is shown a modified form of operating means for the locking detents in which each of the radially movable detents 100 are formed with a rounded inner end 101 which serves to provide a nose portion 102. The detents 100 are provided with beveled outer surfaces 103 which cooperate with the beveled end surface 104 on the cylinder 10. In this form of the invention, a plunger 105 is provided on the outer end thereof with a shank portion 106 having diametrically opposed flat surfaces 108 which terminate in flat surfaces 109 disposed outwardly of the flat surfaces 107.

The operation of the form of invention shown in FIGS. 9 and 10 is the same as that described above in connection with FIGS. 5 and 6.

It will be obvious that by the above described invention there is provided a relatively simple, yet highly effective fluid pressure actuator and locking means in which the locking mechanism is relatively simple and strong, the structure being such as to eliminate all levers and also providing a structure which is substantially foolproof in operation, in that both compression spring and fluid pressure may be utilized, either together or one in place of the other to operate the locking mechanism thereby reducing the likelihood of failure to a minimum and furthermore, the structure of this invention may be utilized for providing either a double acting or a single acting fluid pressure actuator, even though for purposes of illustration and simplification only, a double acting actuator is shown and described in this application.

It will be obvious to those skilled in the art that various changes may be made in the invention without departing from the spirit and scope thereof and therefore the invention is not limited by that which is shown in the drawings and described in the specification, but only as indicated in the appended claims.

What is claimed is:

1. A double acting fluid pressure actuator and locking means comprising an elongated hollow cylinder, each end surface of said cylinder being beveled outwardly, a cylinder head received on one end of said cylinder, an inwardly opening annular recess between said head and the adjacent end of said cylinder, means on said head for attaching the same to a cooperating structure, a fluid pressure inlet in said head communicating with said cylinder, a piston slidably received in said cylinder, a piston rod connected to said piston and projecting from the opposite end of said cylinder, a second cylinder head received on the opposite end of said cylinder and surrounding said piston rod, a second inwardly opening annular recess between said second head and the adjacent end of said cylinder, a second fluid pressure inlet in said second head communicating with said cylinder, a central axial bore in each end of said piston, a radial aperture in each end of said piston communicating with said bore, a second bore in each end of said piston concentric with said first bore and of smaller diameter, a plunger slidably disposed in each of said second bores, a fluid pressure passage in said piston between the first bore in one end of said piston and the second bore in the opposite end of said piston, a second fluid pressure passage between the first bore in said opposite end of said piston and the second bore in said one end of said piston, spring means for urging each plunger axially outwardly of said piston, a locking detent slidably disposed in each of said radial apertures, beveled surfaces on the outer ends of said detents for engaging the beveled end surfaces on said cylinder and means for moving said detents outwardly and locking the same in outward position, said means comprising a roller rotatably mounted in a recess in said detent, said roller having a part thereof cooperating with a surface on said plunger, each element being movable between a locked and unlocked position, whereby with said piston at one end of said cylinder a detent will be moved outwardly into the adjacent annular recess and locked in position by said rockable element to lock said piston against movement, and upon admission of fluid pressure into one end of said cylinder the plunger at that end of said piston will be forced inwardly to release said detent to permit inward movement thereof and movement of said piston to the opposite end of said cylinder, the spring at the opposite end of said piston and fluid pressure through the passage to the second bore at said opposite end of said piston serving to move the plunger at said opposite end of said piston and its associated detent outwardly and lock the same in the annular recess at the opposite end of said cylinder by said rockable element to lock said piston against movement in the opposite direction.

2. A double acting fluid pressure actuator and locking means as defined in claim 1, in which said means for moving each detent outwardly and locking the same in outward position comprises a flat surface on the inner end of each detent, each flat surface being disposed at right angles to the longitudinal axis of each detent and merging into an arcuate surface and an inclined surface extending inwardly from the outer end of each plunger opposite each detent, said inclined surface terminating in a second flat surface disposed at right angles to the longitudinal axis of each detent, said rockable element comprising a roller disposed between each detent and each plunger, each roller being eccentrically mounted for rocking movement in said piston with respect to the longitudinal axis of each detent, the radius of each roller being substantially equal to the radius of each arcuate surface, whereby upon outward movement of each plunger said inclined surfaces will engage and rotate said rollers about said eccentric mountings to move said detents outwardly, said rollers engaging said arcuate surfaces and said second flat surfaces to lock said detents in outward position.

3. A double acting fluid pressure actuator and locking means as defined in claim 1, in which said means for moving each detent outwardly and locking the same in outward position comprises a flat surface on the inner end of each detent, each flat surface being disposed at right angles to the longitudinal axis of each detent and an inclined surface extending inwardly from the outer end of each plunger opposite each detent, said inclined surface terminating in a second flat surface disposed at right angles to the longitudinal axis of each detent, said rockable element comprising a roller disposed between each detent and each plunger, each roller being eccentrically mounted for rocking movement in said piston with respect to the longitudinal axis of each detent, whereby upon outward movement of each plunger said inclined surfaces will engage and rotate said rollers about said eccentric mounting to move said detents outwardly, said rollers engaging said second flat surfaces to lock said detents in outward position.

4. A double acting fluid pressure actuator and locking means as defined in claim 1, in which said means for moving each detent outwardly and locking the same in outward position comprises a flat surface on each plunger at right angles to the longitudinal axis of each detent, each flat surface terminating at the inner end in a shoulder, said rockable element comprising a toggle member mounted on each detent for rocking movement about an axis at right angles to the longitudinal axis of each detent, a curved surface on each toggle member engaging each flat surface and a nose portion on each toggle member engaging each shoulder, whereby upon outward movement of each plunger each shoulder will engage each nose portion to rock said toggle member and move each detent outwardly, each nose portion moving into engagement with each flat surface in dead center position to lock said detents in outward position.

5. A double acting fluid pressure actuator and locking means as defined in claim 1, in which said means for moving each detent outwardly and locking the same in outward position comprises a flat surface on each plunger at right angles to the longitudinal axis of each detent, each flat surface terminating at the inner end in a shoulder, said rockable element comprising a toggle member mounted on each detent for rocking movement about an axis at right angles to the longitudinal axis of each detent and a nose portion on each toggle member engaging each shoulder, whereby upon outward movement of each plunger each shoulder will engage each nose portion to rock said toggle member and move each detent outwardly, each nose portion moving into engagement with each flat surface in dead center position to lock said detents in outward position.

6. A double acting fluid pressure actuator and locking means comprising an elongated hollow cylinder, each end surface of said cylinder being beveled outwardly, a cylinder head received on one end of said cylinder, an inwardly opening annular recess between said head and the adjacent end of said cylinder, means on said head for attaching the same to a cooperating structure, a fluid pressure inlet in said head communicating with said cylinder, a piston slidably received in said cylinder, a piston rod connected to said piston and projecting from the opposite end of said cylinder, a second cylinder head received on the opposite end of said cylinder and surrounding said piston rod, a second inwardly opening annular recess between said second head and the adjacent end of said cylinder, a second fluid pressure inlet in said second head communicating with said cylinder, a central axial bore in each end of said piston, a radial aperture in each end of said piston communicating with said bore, a second bore in each end of said piston concentric with said first bore and of smaller diameter, a plunger slidably disposed in each of said second bores, a fluid pressure passage in said piston between the first bore in one end of said piston and the second bore in the opposite end of said piston, a second fluid pressure passage between the first bore in said opposite end of said piston and the second bore in said one end of said piston, spring means for urging each plunger axially outwardly of said piston, locking detents slidably disposed in said radial apertures, beveled surfaces on the outer ends of said detents for engaging the beveled end surfaces on said cylinder and means for moving said detents outwardly and locking the same in outward position comprising a flat surface on the outer end of each plunger disposed at right angles to the longitudinal axis of each detent, each flat surface merging into an inwardly extending curved cam surface, each cam surface terminating in a second flat surface disposed radially outward of said first flat surface, and a roller rotatably mounted in the inner end of each detent and engaging said first flat surfaces when said detents are in inward position, whereby with said piston at one end of said cylinder and upon outward movement of one plunger the cam surface on said one plunger will move the associated detent outwardly into the adjacent annular recess to lock said piston against movement and movement of the roller on said last named detent into engagement with said second flat surface will lock said last named detent in outward position and upon admission of fluid pressure into said one end of said cylinder said one plunger will be forced inwardly to release said last named detent to permit inward movement thereof and movement of said piston to the opposite end of said cylinder, the spring at the opposite end of said piston and fluid pressure through the passage to the second bore at said opposite end of said piston serving to move the plunger at said opposite end of said piston and the associated detent outwardly and lock the same in the annular recess at the opposite end of said cylinder to lock said piston against movement in the opposite direction.

References Cited by the Examiner
UNITED STATES PATENTS 2,997,985   8/1961   Chace _____ 92—25

SAMUEL LEVINE, *Primary Examiner.*

RICHARD B. WILKINSON, *Examiner.*